United States Patent
Yoneyama

(10) Patent No.: US 10,084,172 B2
(45) Date of Patent: Sep. 25, 2018

(54) NONAQUEOUS ELECTROLYTE SECONDARY BATTERY SEPARATOR AND USE THEREOF

(71) Applicant: Sumitomo Chemical Company, Limited, Tokyo (JP)

(72) Inventor: Satoshi Yoneyama, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/362,904

(22) Filed: Nov. 29, 2016

(65) Prior Publication Data

US 2017/0155122 A1 Jun. 1, 2017

(30) Foreign Application Priority Data

Nov. 30, 2015 (JP) ................. 2015-233942

(51) Int. Cl.
*H01M 2/16* (2006.01)
*H01M 2/18* (2006.01)
*H01M 10/0525* (2010.01)

(52) U.S. Cl.
CPC ....... *H01M 2/1686* (2013.01); *H01M 2/1653* (2013.01); *H01M 2/18* (2013.01); *H01M 10/0525* (2013.01)

(58) Field of Classification Search
CPC .......................... H01M 2/1686; H01M 2/1653
See application file for complete search history.

(56) References Cited

U.S. PATENT DOCUMENTS

| | | |
|---|---|---|
| 2007/0221567 A1 | 9/2007 | Simmons et al. |
| 2010/0285348 A1 | 11/2010 | Murata et al. |
| 2011/0293989 A1 | 12/2011 | Hasegawa et al. |
| 2012/0129034 A1* | 5/2012 | Hasegawa ............ B32B 27/18 429/144 |
| 2014/0363729 A1 | 12/2014 | Kim et al. |
| 2015/0004466 A1* | 1/2015 | Yashiki ............... B29C 55/085 429/144 |
| 2015/0372275 A1* | 12/2015 | Lee .................... H01M 2/1686 429/145 |
| 2015/0372276 A1* | 12/2015 | Mizuno ................ B32B 27/32 429/145 |
| 2015/0380707 A1 | 12/2015 | Iwai et al. |
| 2016/0043372 A1 | 2/2016 | Simmons et al. |
| 2016/0204406 A1* | 7/2016 | Ryu ..................... H01M 2/145 429/144 |
| 2017/0040584 A1 | 2/2017 | Kurakane et al. |

FOREIGN PATENT DOCUMENTS

| | | |
|---|---|---|
| CN | 1509307 A | 6/2004 |
| CN | 101041722 A | 9/2007 |
| CN | 101600571 A | 12/2009 |
| CN | 102307944 A | 1/2012 |
| JP | 2005/11726 A | 1/2005 |
| JP | 2010180341 A | 8/2010 |
| JP | 201151330 A | 3/2011 |
| JP | 2013159750 A | 8/2013 |
| JP | 2013173283 A | 9/2013 |
| JP | 2013211155 A | 10/2013 |
| JP | 5612797 B1 | 10/2014 |
| JP | 2014-218668 A | 11/2014 |
| JP | 2015511764 A | 4/2015 |
| JP | 2015/171814 A | 10/2015 |
| JP | 2015208893 A | 11/2015 |
| WO | 2007046226 A1 | 4/2007 |
| WO | 2007117006 A1 | 10/2007 |
| WO | WO-2013118638 A1 * | 8/2013 ........... B29C 55/085 |
| WO | 2015083705 A1 | 6/2015 |

OTHER PUBLICATIONS

Office Action dated Apr. 19, 2016 in JP Application No. 2015-233942.
Decision to Grant dated Aug. 9, 2016 in JP Application No. 2015-233942.
Office Action dated Mar. 22, 2017 in KR Application No. 10-2016-0161041.
Office Action dated May 4, 2017 in CN Application No. 201611078486.6.
Office Action dated Oct. 13, 2017 in CN Application No. 201611078486.6.
Office Action dated Sep. 20, 2017 in KR Application No. 10-2016-0161041.

* cited by examiner

*Primary Examiner* — Jonathan G Jelsma
(74) *Attorney, Agent, or Firm* — Panitch Schwarze Belisario & Nadel LLP

(57) ABSTRACT

Provided is a nonaqueous electrolyte secondary battery separator excellent in voltage-withstanding property. This nonaqueous electrolyte secondary battery separator has (i) a film thickness of not more than 20 μm, (ii) a peeling strength, measured by a blocking test, of not less than 0.2 N, and (iii) a puncture strength that changes through the blocking test by not more than 15%. The blocking test is carried out by (i) sandwiching, by a jig of 100 mm×100 mm, two 80 mm×80 mm pieces of a separator, (ii) allowing the two 80 mm×80 mm pieces to rest for 30 minutes under a load of 3.5 kg at a temperature of 133° C.±° C., (iii) removing the load, (iv) cooling the two 80 mm×80 mm pieces to room temperature, (vi) cutting out a specimen of 27 mm×80 mm from the two 80 mm×80 mm pieces, and then (vi) measuring a peeling strength of the specimen at 100 mm/min.

7 Claims, No Drawings

NONAQUEOUS ELECTROLYTE SECONDARY BATTERY SEPARATOR AND USE THEREOF

This Nonprovisional application claims priority under 35 U.S.C. § 119 on Patent Application No. 2015-233942 filed in Japan on Nov. 30, 2015, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator") and to use of the nonaqueous electrolyte secondary battery separator. More specifically, the present invention relates to (i) a nonaqueous electrolyte secondary battery separator, (ii) a laminated separator for a nonaqueous electrolyte secondary battery (hereinafter referred to as a "nonaqueous electrolyte secondary battery laminated separator") including the nonaqueous electrolyte secondary battery separator, (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries, such as lithium secondary batteries, are currently in wide use as batteries for devices such as a personal computer, a mobile telephone, and a portable information terminal.

A nonaqueous electrolyte secondary battery, which is typified by a lithium secondary battery, has a high energy density, and may thus let a large electric current flow and generate heat in a case where a breakage in the battery or in the device using that battery has caused an internal or external short circuit. This risk has created a demand that a nonaqueous electrolyte secondary battery should prevent more than a certain level of heat generation to ensure a high level of safety.

Meanwhile, porous films are widely used as a separator provided between a cathode and an anode in a nonaqueous electrolyte secondary battery. Such a separator formed by a porous film has a function of preventing a short circuit between the cathode and the anode, and thereby significantly contributes to reliability (safety) of the nonaqueous electrolyte secondary battery. Patent Literatures 1 through 3, for example, each disclose a technique for preventing laminated electrodes from being shifted with respect to each other, so that a high level of safety can be achieved. According to the technique, a separator is shaped into a bag-like form by heat-sealing respective surfaces of two porous films by which a separator is formed.

CITATION LIST

Patent Literature

[Patent Literature 1]
Japanese Patent Application Publication Tokukai No. 2013-173283 (Publication date: Sep. 5, 2013)
[Patent Literature 2]
Japanese Translation of PCT International Application Tokuhyo No. 2015-511764 (Publication date: Apr. 20, 2015)
[Patent Literature 3]
Japanese Patent Application Publication Tokukai No. 2013-211155 (Publication date: Oct. 10, 2013)
[Patent Literature 4]
Japanese Patent Application Publication Tokukai No. 2010-180341 (Publication date: Aug. 19, 2010)

SUMMARY OF INVENTION

Technical Problem

Even in a case of such a separator shaped into a bag-like form, however, a short circuit may still occur at a part of the separator which part is deteriorated due to a voltage across a cathode and an anode.

The present invention has been attained in view of the above problem, and an object of the present invention is to provide a nonaqueous electrolyte secondary battery separator excellent in voltage-withstanding property, a nonaqueous electrolyte secondary battery laminated separator including the nonaqueous electrolyte secondary battery separator, a nonaqueous electrolyte secondary battery member including the nonaqueous electrolyte secondary battery separator, and a nonaqueous electrolyte secondary battery including the nonaqueous electrolyte secondary battery separator.

Solution to Problem

The inventor of the present invention focused on the fact that a voltage-withstanding property of a nonaqueous electrolyte secondary battery separator is related to (i) peeling strength which is measured by subjecting the nonaqueous electrolyte secondary battery separator to a blocking test and (ii) an amount by which puncture strength of the nonaqueous electrolyte secondary battery separator changes through the blocking test. Then, the inventor of the present invention accomplished the present invention by finding that a nonaqueous electrolyte secondary battery separator having excellent voltage-withstanding property can be produced by causing (i) the peeling strength and (ii) the amount, by which the puncture strength changes through the blocking test, to fall within given ranges.

Patent Literature 4 discloses that a separator excellent in puncture strength can be produced by specifying a weight-average molecular weight and an intrinsic viscosity. However, Patent Literature 4 merely evaluates only the puncture strength, and neither discloses nor suggests at all (i) the peeling strength measured by the blocking test, (ii) the amount by which the puncture strength changes through the blocking test, or (iii) a relationship between (a) the peeling strength, (b) the amount by which the puncture strength changes through the blocking vest, and (c) the voltage-withstanding property.

A nonaqueous electrolyte secondary battery separator in accordance with an embodiment of the present invention, which solves the problem mentioned above, includes a porous film containing a polyolefin-based resin as a main component, the nonaqueous electrolyte secondary battery separator having: a peeling strength of not less than 0.2 N, the peeling strength being measured by a blocking test; and a puncture strength that changes through the blocking test by not more than 15%, the blocking test being carried out by (i) sandwiching, by a jig of 100 mm×100 mm, two 80 mm×80 mm pieces of the nonaqueous electrolyte secondary battery separator, (ii) allowing the two 80 mm×80 mm pieces to rest under a load of 3.5 kg at a temperature of 133° C.±1° C. for 30 minutes, (iii) removing the load, (iv) cooling the two 80 mm×80 mm pieces to room temperature, and then (v) measuring a peeling strength of the specimen at 100 mm/min.

The nonaqueous electrolyte secondary battery separator preferably has a film thickness of not more than 20 μm.

A nonaqueous electrolyte secondary battery laminated separator in accordance with an embodiment of the present invention includes the nonaqueous electrolyte secondary battery separator and a porous layer.

A nonaqueous electrolyte secondary battery member in accordance with an embodiment of the present invention includes: a cathode; the nonaqueous electrolyte secondary battery separator or the nonaqueous electrolyte secondary battery laminated separator; and an anode, the cathode, the nonaqueous electrolyte secondary battery separator or the nonaqueous electrolyte secondary battery laminated separator, and the anode being provided in this order.

A nonaqueous electrolyte secondary battery in accordance with an embodiment of the present invention includes the nonaqueous electrolyte secondary battery separator or the nonaqueous electrolyte secondary battery laminated separator.

Advantageous Effects of Invention

The present invention makes it possible to achieve (i) a nonaqueous electrolyte secondary battery separator having an excellent voltage-withstanding property and (ii) a nonaqueous electrolyte secondary battery having an excellent voltage-withstanding property.

DESCRIPTION OF EMBODIMENTS

The description below will discuss an embodiment of the present invention. The present invention is, however, not limited to such an embodiment. That is, the present invention is not limited to configurations described below, but can be altered by a skilled person in the art within the scope of the claims. An embodiment derived from a proper combination of technical means each disclosed in a different embodiment is also encompassed in the technical scope of the present invention.

Embodiment 1: Nonaqueous Electrolyte Secondary Battery Separator

A nonaqueous electrolyte secondary battery separator (hereinafter also referred to as a "separator") in accordance with an embodiment of the present invention is a porous film containing a polyolefin-based resin as a main component, and is provided between a cathode and an anode in a nonaqueous electrolyte secondary battery.

The separator only needs to be made of a porous and filmy base material containing a polyolefin-based resin as a main component (i.e., made of a polyolefin-based porous base material). The separator is a film that (i) has therein pores connected to one another and (ii) allows a gas or a liquid to pass therethrough from one surface to the other surface.

The separator is melted and made non-porous in a case where a battery generates excessive heat, and thereby imparts a shutdown function to the nonaqueous electrolyte secondary battery. The separator can include a single layer or a plurality of layers.

The separator has a thickness of preferably not more than 20 μm, more preferably not more than 16 μm, and even more preferably not more than 11 μm. Furthermore, the thickness is preferably not less than 4 μm, more preferably not less than 5 μm, and even more preferably not less than 6 μm. That is, the thickness is preferably not less than 4 μm and not more than 20 μm.

The separator in accordance with an embodiment of the present invention has a peeling strength of not less than 0.2 N, preferably not less than 0.3 N, and more preferably not less than 0.35 N as measured by a blocking test in conformity with JIS K6404-14. The peeling strength is typically not more than 2 N, and can be not more than 1 N. The blocking test is carried out by (i) sandwiching two separators of 80 mm×80 mm by a jig of 100 mm×100 mm, (ii) allowing the two separators to rest for 30 minutes under a load of 3.5 kg at a temperature of 133° C.±1° C., (iii) removing the load, (iv) cooling the two separators to room temperature, and then (v) measuring peeling strength by a testing machine at 100 mm/min.

The peeling strength is measured by a so-called T-peel test carried out such that respective end parts of two films, which are stacked without use of a supporting substrate or the like, are each pinched by a jig (chuck) and are then pulled in opposite directions perpendicular to an unpeeled film surface of each of the two films.

The T-peel test is carried out in conformity with JIS-K 6854-3. Specifically, a specimen was prepared by cutting out two films of 27 mm×80 mm from a separator that has been cooled to room temperature. Then, respective short sides of the two films, by which the specimen is formed, are entirely pinched by chucks of a device and are pulled in opposite directions, so that the two films are longitudinally peeled off from each other while the peeling strength is measured.

Note that immediately after the peeling is started, the peeling strength increases over time. Then, the peeling strength substantially stays at a constant value (stabilizes) until immediately before the peeling is finished. A measurement of peeling strength is obtained by averaging values of the peeling strength measured during a period between (i) a time point at which the peeling strength stabilizes after the peeling is started and (ii) a time point immediately before the peeling is finished.

The peeling strength measured by the blocking test is related to density of a porous structure of the separator. Greater density leads to greater peeling strength. This means that a separator having a peeling strength of, for example, 0.2 N as measured by the blocking test has a dense porous structure. Consequently, the separator is strong and therefore has a higher voltage-withstanding property.

Furthermore, a separator that has a peeling strength of, for example, not less than 0.2 N as measured by the blocking test tends to have a heat-sealing property sufficient for shaping two separators into a bag-like form. This makes it possible to stably produce a separator in a bag-like form, and therefore allows safety of nonaqueous electrolyte secondary battery to be maintained.

The separator only needs to have a heat-sealing property of not less than 7 N and preferably not less than 10 N as measured by the following heat-sealing property test.

(Heat-Sealing Property Test)

Two test samples of 80 mm×80 mm were sealed at one end at 140° C. for one second by use of a clip sealer Z-1, manufactured by Technoimpulse Co., Ltd. A specimen of 27 mm×80 mm is cut out from the test samples which have been sealed at one end, and a heat-sealing property (peeling strength) of the specimen is measured at 100 mm/min with use of AUTOGRAPH AGS-50NX, manufactured by Shimadzu Corporation. Such measurement is carried out three times by use of respective three sets of test samples prepared as thus described, and then an average of three measurements is obtained.

The separator has a puncture strength that changes through the blocking test by an amount of not more than 15%, preferably not more than 10%, and more preferably not more than 5%. The amount is typically not less than 0.1%, and can be not less than 1%. Note that the puncture strength is a maximum stress (gf) that is measured through puncturing, at 200 mm/min, a separator with use of a pin having a diameter of 1 mm and having a tip whose radius is 0.5 R. The amount by which the puncture strength changes through the blocking test is based on an absolute value of a difference between respective piecing strengths before and after the blocking test, and is expressed by the following equation:

100×[(puncture strength measured after blocking test)−(puncture strength measured before blocking test)]/(puncture strength measured before blocking test).

The amount by which the puncture strength changes through the blocking test is proportional to an amount by which a shape of the separator changes through the blocking test. The amount by which the shape of the separator changes due to the load used in the blocking test is based on strength of a mesh structure of the separator. Greater strength of the mesh, structure leads to a higher voltage-withstanding property. This means that a separator having a puncture strength that changes through the blocking test by, for example, not more than 15% has a firm structure, so that a voltage-withstanding property of the separator serving as a nonaqueous electrolyte secondary battery can be sufficient.

The separator has a puncture strength of preferably not less than 2 N, and more preferably not less than 3 N. An excessively small puncture strength may allow the separator to be puncture by cathode active material particles and anode active material particles in a case where, for example, (i) an operation of laminating and winding a cathode, an anode, and the separator is carried out during a battery assembling process, (ii) an operation of pressing and tightening a wound group is carried out during a battery assembling process, or (iii) the battery is pressured from outside. This may cause a short circuit between the cathode and the anode.

The separator has a porosity, based on volume, of preferably 0.2 to 0.8 (20% by volume to 80% by volume), and more preferably 0.3 to 0.75 (30% by volume to 75% by volume) so as to (i) retain a larger amount of electrolyte and (ii) achieve a function of reliably preventing (shutting down) a flow of an excessively large electric current at a lower temperature. The separator has pores having an average diameter (average pore diameter) of preferably not more than 0.3 µm, and more preferably not more than 0.14 µm so as to achieve sufficient ion permeability and to prevent particles from entering a cathode and an anode.

The average pore diameter of the separator is controlled through, for example, a method of, in a case of reducing the pore diameter, (i) uniformizing the dispersion state of a pore forming agent such as an inorganic filler or of a phase separating agent during production of the separator, (ii) using, as a pore forming agent, an inorganic filler having smaller particle sizes, (iii) stretching the separator in a state where the separator contains a phase separating agent, or (iv) stretching the separator at a low extension magnification. The porosity of the separator is controlled through, for example, a method of, in a case of producing a separator having a high porosity, (i) increasing the amount of a pore forming agent such as an inorganic filler or of a phase separating agent relative to the polyolefin-based resin, (ii) stretching the separator after the phase separating agent has been removed, or (iii) stretching the separator at a high extension magnification.

A decrease in average pore diameter of the separator is considered to cause an increase in capillary force, which is presumably driving force for introducing the electrolyte into pores inside the base material. In addition, a small average pore diameter makes it possible to inhibit a dendrite from being generated by lithium metals.

An increase in porosity of the separator is considered to cause a decrease in volume of a part of the separator which part contains a polyolefin-based resin that cannot be permeated by the electrolyte.

The separator contains a polyolefin component at a proportion of typically not lower than 50% by volume, preferably not lower than 90% by volume, and more preferably not lower than 95% by volume of the entire separator. The separator preferably contains, as the polyolefin component, a high molecular weight component having a weight-average molecular weight of $5 \times 10^5$ to $15 \times 10^6$. The separator particularly preferably contains, as the polyolefin component, a polyolefin component having a weight-average molecular weight of 1,000,000 or more. This is because higher strength can be achieved by (i) such a separator and (ii) a nonaqueous electrolyte secondary battery laminated separator including the separator and a porous layer.

Examples of the polyolefin-based resin, by which the separator is formed, include high molecular weight homopolymers or copolymers produced through polymerization of ethylene, propylene, 1-butene, 4-methyl-1-pentene, 1-hexene, and/or the like. The separator can be a layer containing only one of these polyolefin-based-resins and/or a layer containing two or more of these polyolefin-based resins. Among the examples, a high molecular weight polyethylene containing ethylene as a main component is particularly preferable. Note that the separator can contain another component which is not a polyolefin, as long as the another component does not impair the function of the layer.

The separator has a Gurley air permeability typically in a range from 30 sec/100 cc to 500 sec/100 cc, and preferably in a range from 50 sec/100 cc to 300 sec/100 cc. A porous film having such an air permeability can achieve sufficient ion permeability.

The separator has a weight per unit area of typically 4 $g/m^2$ to 20 $g/m^2$, preferably 4 $g/m^2$ to 12 $g/m^2$, and more preferably 5 $g/m^2$ to 10 $g/m^2$. This is because such a weight per unit area can increase (i) a strength, a thickness, handling easiness, and a weight of the separator and (ii) a weight energy density and a volume energy density of a nonaqueous electrolyte secondary battery including the separator.

A method for producing the separator will be described below. The separator can be produced by, for example, (i) adding a pore forming agent, such as a calcium carbonate or a plasticizing agent, to a thermoplastic resin, so as to form a film, (ii) forming a sheet by removing the pore forming agent from the film by use of an appropriate solvent, and (iii) stretching the sheet. Then, by adjusting a heat fixing temperature during the stretching, it is possible to produce a separator having a peeling strength of not less than 0.2 N as measured by the blocking test and having a puncture strength that changes through the blocking test by not more than 15%. Specifically, an increase in heat fixing temperature makes it possible to (i) increase the peeling strength as measured by the blocking test and (ii) prevent the puncture strength from changing by a large amount. Note that the heat Fixing temperature during the stretching is appropriately set according to a resin material by which the separator is formed.

Specifically, in a case where the separator is to be formed with, for example, a polyolefin resin containing an ultra-high molecular weight polyethylene and a low molecular weight polyolefin having a weight-average molecular weight of not more than 10,000, it is preferable to produce the separator by a method including the steps of:

(1) kneading (a) 100 parts by weight of the ultra-high molecular weight polyethylene, (b) 5 parts by weight to 200 parts by weight of the low molecular weight polyolefin having a weight-average molecular weight of not more than 10,000, and (c) 100 parts by weight to 400 parts by weight of a pore forming agent such as a calcium carbonate, so as to obtain a polyolefin resin composition;

(2) forming a sheet by use of the polyolefin resin composition;

(3) removing the pore forming agent from the sheet obtained in the step (2); and (4) stretching the sheet obtained in the step (3), so as to obtain a separator.

Embodiment 2: Nonaqueous Electrolyte Secondary Battery Laminated Separator

The nonaqueous electrolyte secondary battery separator in accordance with an embodiment of the present invention can include a publicly known porous layer such as an adhesive layer, a heat-resistant layer, and/or a protective layer. In the present specification, a separator including (i) a nonaqueous electrolyte secondary battery separator and (ii) a porous layer is referred to as "nonaqueous electrolyte secondary battery laminated separator" (hereinafter, also referred to as "laminated separator").

The porous layer is laminated to one side or both sides of the separator as appropriate. It is preferable that a resin of which the porous layer is made be insoluble in an electrolyte of a battery and be electrochemically stable in a range of use of the battery. The porous layer that is laminated to one side of the separator is preferably laminated to a surface of the separator which surface faces a cathode of a nonaqueous electrolyte secondary battery which includes the laminated separator, and is more preferably laminated to a surface of the separator which surface is in contact with the cathode.

The voltage-withstanding property of the nonaqueous electrolyte secondary battery tends to be affected by physical properties of the separator, which is a porous film containing a poly olefin-based resin as a main component. That is, a laminated separator including a separator having an excellent voltage-withstanding property likewise exhibits an excellent voltage-withstanding property as with the separator.

Note that the physical properties of the separator included in the laminated separator, such as peeling strength as measured by the blocking test, puncture strength as measured before the blocking test is carried out, and puncture strength as measured after the blocking test is carried out, need to be measured after the porous layer is peeled and removed from the laminated separator.

Specific examples of the resin of which the porous layer is made include: polyolefins such as polyethylene, polypropylene, polybutene, and an ethylene-propylene copolymer; fluorine-containing resins such as polyvinylidene fluoride (PVDF) and polytetrafluoroethylene; fluorine-containing rubbers such as a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; aromatic polyamide; wholly aromatic polyamide (aramid resin); rubbers such as a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate; resins having a melting point or a glass transition temperature of not less than 180° C., such as polyphenylene ether, polysulfone, polyether sulfone, polyphenylene sulfide, polyetherimide, polyamide-imide, polyether amide, and polyester; water-soluble polymers such as polyvinyl alcohol, polyethylene glycol, cellulose ether, sodium alginate, polyacrylic acid, polyacrylamide, and polymethacrylic acid; and the like.

Specific examples of the aromatic poly amides include poly(paraphenylene terephthalamide), poly(methaphenylene isophthalamide), poly(parabenzamide), poly(methabenzamide), poly(4,4'-benzanilide terephthalamide), poly (paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

Among the above resins, fluorine containing resins and aromatic polyamides are preferable. Among the fluorine-containing resins, polyvinylidene fluoride-based resins such as polyvinylidene fluoride (PVDF) and a copolymer of vinylidene fluoride (VDF) and hexafluoropropylene (HFP) are more preferable. Of the two, PVDF is more preferable.

A porous layer that contains a polyvinylidene fluoride-based resin has excellent adhesiveness to an electrode, and can therefore serve as an adhesive layer. A porous layer that contains aromatic polyamide has excellent heat resistance, and can therefore serve as a heat-resistant layer.

The porous layer can contain a filler. Thus, in a case where the porous layer contains a filler, the resin functions also as a binder resin. The filler, which is not particularly limited to any specific filler, can be a filler made of an organic matter or a filler made of an inorganic matter.

Specific examples of the filler made of an organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, of (ii) a copolymer of two or more of such monomers; fluorine-containing resins such as polytetrafluoroethylene, an ethylene tetrafluoride-propylene hexafluoride copolymer, a tetrafluoroethylene-ethylene copolymer, and polyvinylidene fluoride; melamine resin; urea resin; polyethylene; polypropylene; polyacrylic acid and polymethacrylic acid; and the like.

Specific examples of the filler made of an inorganic matter include fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, and glass. The porous layer can contain (i) only one kind of filler or (ii) two or more kinds of fillers in combination.

Among the above fillers, a filler made of an inorganic matter is suitable. A filler made of an inorganic oxide such as silica, calcium oxide, magnesium oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. Alumina has many crystal forms such as α-alumina, β-alumina, γ-alumina, and θ-alumina, and any of the crystal forms can be suitably used. Among the above crystal forms, α-alumina, which is particularly high in thermal stability and chemical stability, is the most preferable.

The filler has a shape that varies depending on, for example, (i) a method for producing the organic matter or inorganic matter as a raw material and (ii) a condition under which the filler is dispersed during preparation of a coating solution for forming the porous layer. The filler can have any of various shapes such as a spherical shape, an oblong shape, a rectangular shape, a gourd shape, and an indefinite irregular shape.

In a case where the porous layer contains a filler, the filler is contained in an amount preferably of 1% by volume to 99% by volume and more preferably of 5% by volume to 95% by volume of the porous layer. The filler which is contained in the porous layer in an amount falling within the above range makes it less likely for a void formed by a contact among fillers to be blocked by, for example, a resin. This makes it possible to obtain sufficient ion permeability and to set a weight per unit area of the porous layer at an appropriate value.

According to an embodiment of the present invention, a coating solution for forming the porous layer is normally prepared by dissolving the resin in a solvent and dispersing the filler in a resultant solution.

The solvent (dispersion medium), which is not particularly limited to any specific solvent, only needs to (i) have no harmful influence on the porous film, (ii) uniformly and stably dissolve the resin, and (iii) uniformly and stably disperse the filler. Specific examples of the solvent (dispersion medium) include: water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide; and the like. The above solvents (dispersion media) can be used alone or in combination of two or more kinds.

The coating solution can be formed by any method provided that the coating solution can meet conditions such as a resin solid content (resin concentration) and a filler amount each necessary for obtainment of a desired porous layer. Specific examples of a method for forming the coating solution include a mechanical stirring method, an ultrasonic dispersion method, a high-pressure dispersion method, a media dispersion method, and the like.

Further, the filler can be dispersed in the solvent (dispersion medium) by use of, for example, a conventionally publicly known disperser such as a three-one motor, a homogenizer, a media disperser, or a pressure disperser. In addition, the coating solution can also be prepared simultaneously with wet grinding of the filler in a case where a liquid in which a resin is dissolved or swelled, or a liquid in which a resin is emulsified is supplied to a wet grinding device during wet grinding carried out to obtain fine particles having a desired average particle size. That is, wet grinding of the filler and preparation of the coating solution may be simultaneously carried out in a single step.

In addition, the coating solution can contain, as a component different from the resin and the filler, additive(s) such as a disperser, a plasticizer, a surfactant, and/or a pH adjuster, provided that the additive(s) does/do not impair the object of the present invention. Note that the additive(s) can be contained in an amount that does not impair the object of the present invention.

A method for applying the coating solution to the separator, i.e., a method for forming the porous layer on a surface of the separator which has been appropriately subjected to a hydrophilization treatment is not particularly restricted. In a case where the porous layer is laminated to both sides of the separator, (i) a sequential lamination method in which the porous layer is formed on one side of the separator and then the porous layer is formed on the other side of the separator, or (ii) a simultaneous lamination method in which the porous layer is formed simultaneously on both sides of the separator is applicable to the case.

Examples of a method for forming the porous layer include: a method in which the coating solution is directly applied to the surface of the separator and then the solvent (dispersion medium) is removed; a method in which the coating solution is applied to an appropriate support, the porous layer is formed by removing the solvent (dispersion medium), and thereafter the porous layer thus formed and the separator are pressure-bonded and subsequently the support is peeled off; a method in which the coating solution is applied to the appropriate support and then the separator is pressure-bonded to an application surface, and subsequently the support is peeled off and then the solvent (dispersion medium) is removed; a method in which the separator is immersed in the coating solution so as to be subjected to dip coating, and thereafter the solvent (dispersion medium) is removed; and the like.

The porous layer can have a thickness that is controlled by adjusting, for example, a thickness of a coated film that is moist (wet) after being coated, a weight ratio between the resin and fine particles, and/or a solid content concentration (a sum of a resin concentration and a fine-particle concentration) of the coating solution. Note that it is possible to use, as the support, a film made of resin, a belt made of metal, or a drum, for example.

A method for applying the coating solution to the separator or the support is not particularly limited to any specific method provided that the method achieves a necessary weight per unit area and a necessary coating area. It is possible to employ a conventionally publicly known method as a coating solution application method. Specific examples of such a conventionally publicly known coating solution application method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, a spray application method, and the like.

Generally, the solvent (dispersion medium) is removed by drying. Examples of a drying method include natural drying, air-blowing drying, heat drying, vacuum drying, and the like. Note, however, that any drying method is usable provided that the drying method allows the solvent (dispersion medium) to be sufficiently removed. For the drying, it is possible to use an ordinary drying device.

Further, it is possible to carry out the drying after replacing the solvent (dispersion medium) contained in the coating solution with another solvent. Examples of a method for removing the solvent (dispersion medium) after replacing the solvent (dispersion medium) with another solvent include a method in which a resin is dissolved in the solvent (dispersion medium) contained in the coating solution, another solvent (hereinafter referred to as a solvent X) that does not dissolve the resin contained in coating solution is used, the separator or the support on which a coated film has been formed by application of the coating solution is immersed in the solvent X, the solvent (dispersion medium) contained in the coated film formed on the separator or the support is replaced with the solvent X, and thereafter the solvent X is evaporated. This method makes it possible to efficiently remove the solvent (dispersion medium) from the coating solution.

Assume that heating is carried out so as to remove the solvent (dispersion medium) or the solvent X from the coated film of the coating solution which coated film has been formed on the separator or the support. In this case, in order to prevent the separator from having a lower air permeability due to contraction of pores of the separator, it is desirable to carry out heating at a temperature at which the separator does not have a lower air permeability, specifically, 10° C. to 120° C., more preferably 20° C. to 80° C.

In a case where the separator is used as the base material to form the laminated separator by laminating the porous layer to one side or both sides of the separator, the porous layer formed by the method described earlier has, per one side thereof, a film thickness preferably of 0.5 μm to 15 μm and more preferably of 2 μm to 10 μm.

The porous layer which has a film thickness of not less than 1 μm (not less than 0.5 μm per one side) makes it possible to sufficiently prevent an internal short circuit due to, for example, breakage of a battery in the nonaqueous electrolyte secondary battery laminated separator including the porous layer, and such a porous layer is preferable because the porous layer makes it possible to maintain an amount of an electrolyte retained in the porous layer. Meanwhile, the porous layer whose both sides have a film thickness of not more than 30 μm in total (whose one side has a film thickness of not more than 15 μm) is preferable because such a porous layer makes it possible to (i) prevent a deterioration, caused in a case where charge and discharge cycles are repeated, in (a) cathode of a nonaqueous electrolyte secondary battery and (b) rate characteristic and/or cycle characteristic by preventing as increase in permeation resistance of ions such as lithium ions in the entire nonaqueous electrolyte secondary battery laminated separator including the porous layer, and (ii) prevent an increase in size of the nonaqueous electrolyte secondary battery by preventing an increase in distance between the cathode and an anode of the nonaqueous electrolyte secondary battery.

In a case where the porous layer is laminated to both of the porous film, physical properties of the porous layer which are described below at least refer to physical properties of the porous layer which is laminated to a surface of the porous film which surface faces the cathode of the nonaqueous electrolyte secondary battery which includes the laminated separator.

The porous layer, which only needs to have, per one side thereof, a weight per unit area which weight is appropriately determined in view of a strength, a film thickness, a weight, and handling easiness of the nonaqueous electrolyte secondary battery laminated separator, normally has a weight per unit area preferably of 1 g/m² to 20 g/m² and more preferably of 4 g/m² to 10 g/m² so that the nonaqueous electrolyte secondary battery which includes the nonaqueous electrolyte secondary battery laminated separator as a member can have a higher weight energy density and a higher volume energy density. The porous layer which has a weight per unit area which weight falls within the above range is preferable because such a porous layer (i) allows the nonaqueous electrolyte secondary battery which includes, as a member, the nonaqueous electrolyte secondary battery laminated separator including the porous layer to have a higher weight energy density and a higher volume energy density, and (ii) allows the nonaqueous electrolyte secondary battery to have a lighter weight.

The porous layer has a porosity preferably of 20% by volume to 90% by volume and more preferably of 30% by volume to 70% by volume because the nonaqueous electrolyte secondary battery laminated separator including such a porous layer can obtain sufficient ion permeability. Further, the porous layer has pores having a pore size preferably of not more than 1 μm and more preferably of not more than 0.5 μm because the nonaqueous electrolyte secondary battery laminated separator including such a porous layer can obtain sufficient ion permeability.

The laminated separator has a Gurley air permeability preferably of 30 sec/100 mL to 1000 sec/100 mL and more preferably of 50 sec/100 mL to 800 sec/100 mL. The laminated separator which has a Gurley air permeability falling within the above range makes it possible to obtain sufficient ion permeability in a case where the laminated separator is used as a member for the nonaqueous electrolyte secondary battery.

Meanwhile, the laminated separator which has a Gurley air permeability beyond the above range means that the laminated separator has a coarse laminated structure due to a high porosity thereof. This causes, the laminated separator to have a lower strength, so that the laminated separator may be insufficient in shape stability, particularly shape stability at a high temperature. In contrast, the laminated separator which has a Gurley air permeability falling below the above range makes it impossible to obtain sufficient ion permeability in a case where the separator is used as a member for the nonaqueous electrolyte secondary battery. This may cause the nonaqueous electrolyte secondary battery to have a lower battery characteristic.

Embodiment 3: Nonaqueous Electrolyte Secondary Battery Member

Embodiment 4: Nonaqueous Electrolyte Secondary Battery

A nonaqueous electrolyte secondary battery member in accordance with Embodiment 3 of the present invention is a nonaqueous electrolyte secondary battery member including a cathode, a nonaqueous electrolyte secondary battery separator in accordance with Embodiment 1 of the present invention or a nonaqueous electrolyte secondary battery laminated separator in accordance with Embodiment 2 of the present invention, and an anode that are provided in this order. A nonaqueous electrolyte secondary battery in accordance with Embodiment 4 of the present invention includes a nonaqueous electrolyte secondary battery separator in accordance with Embodiment 1 of the present invention or a nonaqueous electrolyte secondary battery laminated separator in accordance with Embodiment 2 of the present invention. The following description is given by (i) taking a lithium ion secondary battery member as an example of the nonaqueous electrolyte secondary battery member and (ii) taking a lithium ion secondary battery as an example of the nonaqueous electrolyte secondary battery. Note that components of the nonaqueous electrolyte secondary battery member or the nonaqueous electrolyte secondary battery except the nonaqueous electrolyte secondary battery separator or the nonaqueous electrolyte secondary battery laminated separator are not limited to those discussed in the following description.

In the nonaqueous electrolyte secondary battery in accordance with an embodiment of the present invention, it is possible to use, for example, a nonaqueous electrolyte obtained by dissolving lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$, and the like. The above lithium salts can be used alone or in combination of two or more kinds. Of the above lithium salts, at least one kind of fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ is more preferable.

Specific examples of the organic solvent of the nonaqueous electrolyte include: carbonates such as ethylene carbonate, propylene carbonate, dimethyl carbonate, diethyl carbonate, ethyl methyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N-dimethylacetamide; carbamates such as 3-methyl-2-oxazolidone; sulfur-containing compounds such as sulfolane, dimethylsulfoxide, and 1,3-propanesultone; a fluorine-containing organic solvent obtained by introducing a fluorine group in the organic solvent; and the like. The above organic solvents can be used alone or in combination of two or more kinds. Of the above organic solvents, a carbonate is more preferable, and a mixed solvent of cyclic carbonate and acyclic carbonate or a mixed solvent of cyclic carbonate and an ether is more preferable. The mixed solvent of cyclic carbonate and acyclic carbonate is more preferably exemplified by a mixed solvent containing ethylene carbonate, dimethyl carbonate, and ethyl methyl carbonate. This is because the mixed solvent containing ethylene carbonate, dimethyl carbonate, and ethyl methyl carbonate operates in a wide temperature range, and is refractory also in a case where a graphite material such as natural graphite or artificial graphite is used as an anode active material.

Normally, a sheet cathode in which a cathode current collector supports thereon a cathode mix containing a cathode active material, an electrically conductive material, and a binding agent is used as the cathode.

Examples of the cathode active material include a material that is capable of doping and dedoping lithium ions. Examples of such a material include lithium complex oxides each containing at least one kind of transition metal selected from the group consisting of V, Mn, Fe, Co, and Ni. Of the above lithium complex oxides, a lithium complex oxide having an α-$NaFeO_2$ structure, such as lithium nickel oxide or lithium cobalt oxide, or a lithium complex oxide having a spinel structure, such as lithium manganate spinel is more preferable. This is because such a lithium complex oxide is high in average discharge potential. The lithium complex oxide can contain various metallic elements, and lithium nickel complex oxide is more preferable. Further, it is particularly preferable to use lithium nickel complex oxide which contains at least one kind of metallic element so that the at least one kind of metallic element accounts for 0.1 mol % to 20 mol % of a sum of the number of moles of the at least one kind of metallic element and the number of moles of Ni in lithium nickel oxide, the at least one kind of metallic element being selected from the group consisting of Ti, Zr, Ce, Y, V, Cr, Mn, Fe, Co, Cu, Ag, Mg, Al, Ga, In, and Sn. This is because such lithium nickel complex oxide is excellent in cycle characteristic during use of the nonaqueous electrolyte secondary battery at a high capacity. Especially an active material which contains Al or Mn and has an Ni content of not less than 85% and more preferably of not less than 90% is particularly preferable. This is because such an active material is excellent in cycle characteristic during use of the nonaqueous electrolyte secondary battery at a high capacity, the nonaqueous electrolyte secondary battery including the cathode containing the active material.

Examples of the electrically conductive material include carbonaceous materials such as natural graphite, artificial graphite, cokes, carbon black, pyrolytic carbons, carbon fiber, organic high molecular compound baked bodies, and the like. It is possible to use only one of the above electrically conductive materials or two or more of the above electrically conductive materials in combination by, for example, mixing artificial graphite and carbon black.

Examples of the binding agent include polyvinylidene fluoride, a vinylidene fluoride copolymer, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoroethylene copolymer, a vinylidene fluoride-trichloroethylene copolymer, and a vinylidene fluoride-vinyl fluoridecopolymer, a vinylidene fluoride-hexafluoropropylene-tetrafluoroethylene copolymer, and thermoplastic resins such as thermoplastic polyimide, polyethylene, and polypropylene. Note that the binding agent also functions as a thickener.

The cathode mix can be obtained by, for example, pressing the cathode active material, the electrically conductive material, and the binding agent on the cathode current collector, or causing the cathode active material, the electrically conductive material, and the binding agent to be in a form of paste by use of an appropriate organic solvent.

Examples of the cathode current collector include electrically conductive materials such as Al, Ni, and stainless steel. Among the examples, Al is preferable because it is easy to process into a thin film and is inexpensive.

Examples of a method for producing the sheet cathode, i.e., a method for causing the cathode current collector to support the cathode mix include: a method in which the cathode active material, the electrically conductive material, and the binding agent which are to be formed into the cathode mix are pressure-molded on the cathode current collector; a method in which the cathode current controller is coated with the cathode mix which has been obtained by causing the cathode active material, the electrically conductive material, and the binding agent to be in a form of paste by use of an appropriate organic solvent, and a sheet cathode mix obtained by drying is pressed so as to be closely fixed to the cathode current collector; and the like.

Normally, a sheet anode in which an anode current collector supports thereon an anode mix containing an anode active material is used as the anode.

Examples of the anode active material include a material that is capable of doping and dedoping lithium ions, lithium metal or lithium alloy, and the like. Specific examples of such a material include: carbonaceous materials such as natural graphite, artificial graphite, cokes, carbon black, pyrolytic carbons, carbon fiber, and organic high molecular compound baked bodies; chalcogen compounds such as oxides and sulfides each doping and dedoping lithium ions at a lower potential than that of the cathode; metals such as aluminum (Al), lead (Pb), tin (Sn), bismuth (Bi), and silicon (Si) each alloyed with an alkali metal; cubic intermetallic compounds (AlSb, $Mg_2Si$, $NiSi_2$) having lattice spaces in which alkali metals can be provided; lithium nitrogen compounds ($Li_{3-x}M_xN$ (M: transition metal)); and the like. Of the above anode active materials, a carbonaceous material which contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the cathode. An anode active material which is a mixture of graphite and silicon and has an Si to C ratio of not less than 5% is more preferable, and an anode active material which is a mixture of graphite and silicon and has an Si to C ratio of not less than 10% is still more preferable.

The anode mix can be obtained by, for example, pressing the anode active material on the anode current collector, or causing the anode active material to be in a form of paste by use of an appropriate organic solvent.

Examples of the anode current collector include Cu, Ni, stainless steel, and the like. Among the examples, Cu, which is difficult to alloy with lithium particularly in a lithium ion secondary battery and easy to process into a thin film, is more preferable.

Examples of a method for producing the sheet anode, i.e., a method for causing the anode current collector to support the anode mix include: a method in which the anode active material to be formed into the anode mix are pressure-molded on the anode current collector; a method in which the anode mix which has been obtained by causing the anode active material to be in a form of paste by use of an appropriate organic solvent is applied to the anode current collector, and a sheet anode mix obtained by drying is pressed so as to be closely fixed to the anode current collector; and the like.

The nonaqueous electrolyte secondary battery member in accordance with an embodiment of the present invention is formed by providing the cathode, the nonaqueous electrolyte secondary battery separator or the nonaqueous electrolyte secondary battery laminated separator, and the anode in this order. Thereafter, the nonaqueous electrolyte secondary battery member is placed in a container serving as a housing of the nonaqueous electrolyte secondary battery. Subsequently, the container is filled with a nonaqueous electrolyte, and then the container is sealed while being decompressed. The nonaqueous electrolyte secondary battery in accordance with an embodiment of the present invention can thus be produced. The nonaqueous electrolyte secondary battery, which is not particularly limited in shape, can have any shape such as a sheet (paper) shape, a disc shape, a cylindrical shape, or a prismatic shape such as a rectangular prismatic shape. Note that a method for producing the nonaqueous electrolyte secondary battery is not particularly limited to any specific method, and a conventionally publicly known production method can be employed as the method.

EXAMPLES

<Method for Measuring Physical Properties>

Physical properties of a separator in accordance with each of Examples and Comparative Examples below were measured by the following methods.

(1) Film Thickness

The film thickness was measured in conformity with JIS K7130 with use of VL-50A manufactured by Mitsutoyo Corporation.

(2) Blocking Test

The blocking test was carried out by the following method in conformity with JIS K6404-14. First, two test samples of 80 mm×80 mm were cut out from the separator such that a machine direction of and a traverse direction of the separator were parallel to respective sides of the set of the two test samples. The two test samples, which were aligned with each other in terms of machine and traverse directions, were sandwiched by two glass substrates of 100 mm×100 mm each having a thickness of 3 mm, and were then allowed to rest under a load of 3.5 kg in an atmosphere at 133° C.±1° C. for 30 minutes. The load was then removed. Thereafter, the two test samples were cooled to room temperature. Then, a specimen of 27 mm×80 mm was cut out from the two test samples such that a 80-mm side corresponded to the machine direction. Then, a peeling strength of the specimen was measured through a T-peel test at 100 mm/min with use of an AUTOGRAPH AGS-50NX, manufactured by Shimadzu Corporation. A measurement of peeling strength was obtained by averaging values of the peeling strength measured during a period between (i) a time point at which the peeling strength stabilized after the peeling had been started and (ii) a time point immediately before the peeling was finished. Such measurement was carried out three times by use of respective three sets of test samples prepared as thus described, and then an average of three measurements was obtained.

(3) Puncture Strength

A maximum stress (gf) was measured through (i) fixing the separator by a washer having a diameter of 12 mm and (ii) puncturing the separator with a pin at 200 mm/min. The maximum stress (gf) thus measured was used as a puncture strength of the separator. The pin thus used had a diameter of 1 mm and had a tip whose radius was 0.5 R. An amount by which puncture strength of one separator changed through the blocking test was calculated as expressed by the following equation:

100×|(puncture strength measured after blocking test)−(puncture strength measured before blocking test)|/(puncture strength measured before blocking test)).

(4) Heat-Sealing Property

Two test samples of 80 mm×80 mm that had been cut out from the separator were stacked and sealed at one end at 140° C. for one second by use of a clip sealer Z-1, manufactured by Technoimpulse Co., Ltd. A specimen of 27 mm×80 mm was cut out from the test samples which have been sealed at one end, and a heat-sealing property of the specimen was measured at 100 mm/min with use of AUTOGRAPH AGS-50NX, manufactured by Shimadzu Corporation. Such measurement was carried out three times by use of respective three sets of test samples prepared as thus described, and then an average of three measurements was obtained.

(5) Withstand-Voltage Test

A measurement sample of 130 mm×130 mm was cut out from the separator, and was then subjected to a withstand-voltage test with use of a withstand-voltage tester TOS-9201 manufactured by Kikusui Electronics Corp. The withstand-voltage test was carried out by the following steps:

(a) A laminate prepared by sandwiching the measurement sample with an upper cylinder electrode (having a diameter of 25 mm) and a lower cylinder electrode (having a diameter of 75 mm) was pressed under a load of 3.8 kg.

(b) A voltage across the electrodes was raised to 800 V at a rate of 40 V/s, and was kept at 800 V for 60 seconds.

(c) The laminate that had been subjected to the withstand-voltage test in the step (b) was photographed with use of a digital still camera, so that photographic data was obtained.

(d) The photographic data obtained in the step (c) was binarized (i.e., converted into monochrome photographic data) by use of IMAGEJ, which is a free image-analyzing software provided by National Institutes of Health (NIH). Black portions in the monochrome photographic data were counted as a withstand-voltage deficient portions (deficient portions).

(e) The steps (a) through (d) were repeated ten times, and the numbers of deficient portions obtained in the ten measurements were averaged to obtain an averaged number, which was used as a final number of deficient portions found in the withstand-voltage test.

<Preparation of Separator>

Separators in accordance with Examples 1 through 3 and Comparative Example 1, which were used to produce non-aqueous electrolyte secondary batteries, were prepared as below.

Example 1

First, ultra-high molecular weight polyethylene powder (GUR2024 manufactured by Ticona Corporation) was mixed with polyethylene wax (FNP-0115 manufactured by Nippon Seiro Co., Ltd.) having a weight-average molecular weight of 1,000 at a weight ratio of 68% to 32%, respectively. A total of 100 parts by weight of the mixture of ultra-high molecular weight polyethylene and polyethylene wax was then mixed with (i) 0.4 parts by weight of phenolic antioxidant 1, (ii) 0.1 parts by weight of phosphorous antioxidant 2, and (iii) 1.3 parts by weight of sodium stearate. To the mixture, a calcium carbonate (manufactured by Maruo Calcium Co., Ltd.) having an average particle diameter of 0.1 µm was added so that the calcium carbonate constituted 38% of the whole mixture by volume. The resultant mixture was mixed in the form of powder in a Henschel mixer, and was then melt-kneaded in a twin screw kneading extruder to obtain a polyolefin resin composition. The polyolefin resin composition was rolled with use of a pair of rollers each having a surface temperature of 150° C., so that a sheet was obtained. The sheet thus obtained was immersed in a hydrochloric acid aqueous solution (containing 4 mol/L of hydrochloric acid and 0.5% by weight of nonionic surfactant) to remove calcium carbonate, so that a material polyolefin sheet was obtained. The material polyolefin sheet was then stretched with a stretch ratio of 6.2 times at 105° C. by use of a uniaxial tenter stretching machine, manufactured by Ichikin Co., Ltd. while a heat-fixing chamber of the machine was set to a temperature of 126° C. This resulted in a separator of Example 1. The separator of Example 1 thus obtained had a heat-sealing property of 12.3 N.

Example 2

A separator of Example 2 was obtained as with Example 1 except that (i) GUR4012 manufactured by Ticona Corporation was used in an amount of 75% by weight as ultra-high molecular weight polyethylene powder, (ii) Hi-Wax 110P manufactured by Mitsui Chemicals, Inc. was used in an amount of 25% by weight as polyethylene wax, and (iii) the heat-fixing chamber was set to a temperature of 115° C. The separator thus obtained had a heat-sealing property of 10.2 N.

Example 3

A separator of Example 3 was obtained as with Example 1 except that (i) GUR4032 manufactured by Ticona Corporation was used in an amount of 70% by weight as the ultra-high molecular weight polyethylene powder, (ii) the polyethylene wax was used in amount of 30% by weight, and (iii) the heat-fixing chamber was set at a temperature of 120° C. The separator thus obtained had a heat-sealing property of 7.0 N.

Comparative Example 1

A separator of Comparative Example 1 was obtained as with Example 1 except that (i) GUR4032 manufactured by Ticona Corporation was used in an amount of 70% by weight as the ultra-high molecular weight polyethylene powder, (ii) the polyethylene wax was used in amount of 30% by weight, and (iii) the heat-fixing chamber was set at a temperature of 115° C. The separator thus obtained had a heat-sealing property of 7.4 N.

<Measurement Results of Physical Properties>

Table 1 shows the results of measuring the following aspects of each of the separators obtained in Examples 1 through 3 and Comparative Example 1: (i) thickness, (ii) peeling strength measured by blocking test (iii) weight per unit area, (iv) amount by which puncture strength changed through the blocking test, (v) heat-sealing property, and (vi) voltage-withstanding property measured by withstand-voltage test. Note that in measurement results of the voltage-resistant test in Table 1, "Very Good" indicates that a separator had less than 10 deficient portions, "Good" indicates that a separator had not less than 10 and less than 30 deficient portions, and "Poor" indicates that a separator had not less than 30 deficient portions. All of the separators of Examples 1 through 3 and Comparative Example 1 exhibited a puncture strength of not less than 2 N before the blocking test.

TABLE 1

| | Peeling Strength (N) Measured by Blocking Test | Thickness (µm) | Weight Per Unit Area (g/m$^2$) | Amount (%) by Which Puncture Strength Changed | Voltage-Withstanding Property Measured by Test |
|---|---|---|---|---|---|
| Example 1 | 0.38 | 10.7 | 6.5 | 4.1 | Very Good |
| Example 2 | 0.59 | 15.3 | 7.4 | 9.2 | Good |
| Example 3 | 0.20 | 16.2 | 6.6 | 12.4 | Good |
| Comparative Example 1 | 0.16 | 15.7 | 5.5 | 18.4 | Poor |

As shown in Table 1, Examples 1 through 3 and Comparative Example 1 produced such similar results of weight per unit area as ranging from 5.5 g/m$^2$ to 7.4 g/m$^2$, but produced varying results of (i) peeling strength measured by the blocking test and (ii) amount by which puncture strength changed through the blocking test.

Note that, in general, the voltage-withstanding property is related to the thickness of a separator, and less thickness leads to a less voltage-withstanding property. However, Example 1 that produced the smallest thickness produced the highest voltage-withstanding property, while Example 2 produced the highest voltage-withstanding property among those of Examples 2 and 3 and Comparative Example 1, which produced similar thicknesses. This unique results are associated with the facts that (i) the amount by which puncture strength changed was largest in Comparative Example 1, and was smaller and smaller in Examples 3, 2, and 1 in this order and (ii) the peeling strength as measured by the blocking test in each of Examples 1 through 3 was not less than 0.2 N. The unique results are also due to the fact that there is a correlation between (i) the amount by which puncture strength changed through the blocking test, (ii) the peeling strength, and (iii) the voltage-withstanding property. Table 1 indicates that with a separator whose puncture strength changes through the blocking test by not more than 15% and whose peeling strength as measured by the blocking test is not less than 0.2 N, it is possible to restrict the number of deficient portions to less than 30 even in a case where the separator has a thickness of not more than 20 µm.

Furthermore, it is indicated that the peeling strength measured by the blocking test is correlated with the heat-sealing property. The separators of each of Examples 1 and 2, each of which had a peeling strength of not less than 10 N as measured by the heat-sealing property test, kept adhering to each other without peeling off from each other even during measurement of the heat-sealing property. In contrast, the separators of each of Comparative Example 1 and Example 3, each of which had a peeling strength of less than 10 N as measured by the heat-sealing property test, ended up peeling off, although not easily, from each other during measurement of the heat-sealing property.

It was thus confirmed that in Examples 1 through 3, in each of which a peeling strength was not less than 0.2 N as measured by the blocking test and an amount by which a puncture strength changed through the blocking test was not more than 15%, the numbers of deficient portions during the withstand-voltage tests were small although the thicknesses were not more than 20 µm. It was further confirmed that in Example 1 in which a puncture strength was changed through the blocking test by not more than 5%, the number of deficient portions during the withstand-voltage test was less than 10, and that the separator of Example 1 was therefore quite excellent in voltage-withstanding property.

The invention claimed is:

1. A nonaqueous electrolyte secondary battery separator comprising a porous film containing a polyolefin-based resin as a main component,
    the nonaqueous electrolyte secondary battery separator having:
    a peeling strength of not less than 0.2 N, the peeling strength being measured by a blocking test;
    a puncture strength of not less than 2 N, the puncture strength changing through the blocking test by not more than 15%;
    a heat-sealing property of not less than 10 N; and
    a weight per unit area of 4 g/m² to 20 g/m²,
    the blocking test being carried out by (i) sandwiching, by a jig of 100 mm×100 mm, two 80 mm×80 mm pieces of the porous film containing a polyolefin-based resin as a main component, (ii) allowing the two 80 mm×80 mm pieces to rest under a load of 3.5 kg at a temperature of 133° C.±1° C. for 30 minutes, (iii) removing the load, (iv) cooling the two 80 mm×80 mm pieces to room temperature, (v) cutting out a specimen of 27 mm×80 mm from the two 80 mm×80 mm pieces, and then (vi) measuring a peeling strength of the specimen at 100 mm/min,
    the heat-sealing property being calculated by (I) cutting out two 80 mm×80 mm test samples from the porous film, (II) sealing one end of each test sample at 140° C. for one second, (III) cutting out a specimen of 27 mm×80 mm from each sealed test sample, (IV) measuring the peeling strength of each specimen at 100 mm/min three times, and (V) obtaining an average of the three measurements and using the average as the heat-sealing property.

2. A nonaqueous electrolyte secondary battery separator as set forth in claim 1, wherein:
    a thickness of the nonaqueous electrolyte secondary battery separator is not more than 20 µm.

3. A nonaqueous electrolyte secondary battery member comprising:
    a cathode;
    a nonaqueous electrolyte secondary battery separator recited in claim 1; and
    an anode,
    the cathode, a nonaqueous electrolyte secondary battery separator, and the anode being provided in this order.

4. A nonaqueous electrolyte secondary battery comprising:
    a nonaqueous electrolyte secondary battery separator recited in claim 1.

5. A nonaqueous electrolyte secondary battery laminated separator comprising:
    a nonaqueous electrolyte secondary battery separator recited in claim 1; and
    a porous layer.

6. A nonaqueous electrolyte secondary battery member comprising:
    a cathode;
    a nonaqueous electrolyte secondary battery laminated separator recited in claim 5; and
    an anode,
    the cathode, the nonaqueous electrolyte secondary battery laminated separator, and the anode being provided in this order.

7. A nonaqueous electrolyte secondary battery comprising:
    a nonaqueous electrolyte secondary battery laminated separator recited in claim 5.

* * * * *